US009390165B2

(12) United States Patent
Lu et al.

(10) Patent No.: US 9,390,165 B2
(45) Date of Patent: *Jul. 12, 2016

(54) SUMMARIZATION OF SHORT COMMENTS

(71) Applicant: PayPal, Inc., San Jose, CA (US)

(72) Inventors: Yue Lu, Urbana, IL (US); Neelakantan Sundaresan, Mountain View, CA (US)

(73) Assignee: PayPal, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/242,505

(22) Filed: Apr. 1, 2014

(65) Prior Publication Data

US 2014/0214842 A1  Jul. 31, 2014

Related U.S. Application Data

(63) Continuation of application No. 12/766,697, filed on Apr. 23, 2010, now Pat. No. 8,713,017.

(60) Provisional application No. 61/172,151, filed on Apr. 23, 2009.

(51) Int. Cl.
*G06F 17/30* (2006.01)
*G06Q 30/02* (2012.01)

(52) U.S. Cl.
CPC ...... *G06F 17/30705* (2013.01); *G06F 17/3071* (2013.01); *G06Q 30/02* (2013.01)

(58) Field of Classification Search
None
See application file for complete search history.

(56) References Cited

U.S. PATENT DOCUMENTS

| 6,266,634 | B1 | 7/2001 | Buchsbaum et al. | |
| 8,117,199 | B2 | 2/2012 | Ghani et al. | |
| 2004/0205065 | A1* | 10/2004 | Petras | B01D 3/146 |
| 2005/0049917 | A1* | 3/2005 | Fink | G06Q 30/02 705/14.58 |
| 2006/0129446 | A1 | 6/2006 | Ruhl et al. | |
| 2007/0078669 | A1* | 4/2007 | Dave | G06Q 30/02 705/347 |
| 2007/0078845 | A1 | 4/2007 | Scott et al. | |
| 2008/0027893 | A1 | 1/2008 | Cavestro et al. | |
| 2008/0133488 | A1 | 6/2008 | Bandaru et al. | |
| 2009/0063247 | A1 | 3/2009 | Burgess et al. | |
| 2009/0150920 | A1* | 6/2009 | Jones | G06Q 30/02 725/23 |
| 2009/0164402 | A1 | 6/2009 | Yahia et al. | |
| 2010/0057645 | A1 | 3/2010 | Lauritsen | |
| 2010/0145678 | A1 | 6/2010 | Csomai et al. | |
| 2010/0153318 | A1 | 6/2010 | Branavan et al. | |

OTHER PUBLICATIONS

"U.S. Appl. No. 12/466,697, Examiner Interview Summary mailed Nov. 20, 2012", 3 pgs.

(Continued)

*Primary Examiner* — Bai D. Vu
(74) *Attorney, Agent, or Firm* — Schwegman Lundberg & Woessner, P.A.

(57) ABSTRACT

A method and a system for summarization of short comments are provided. The system comprises a memory to store a comments collection. The comments collection stores a plurality of comments for later access. The comments respectively include an overall rating and at least one phrase. The system also includes one or more processors to implement an aspect module to map a portion of the plurality of comments to a first aspect corresponding to an attribute of the entity. The one or more processor also implementing a rating module to determine an aspect rating corresponding to the first aspect based on the respective overall rating of the portion of the plurality of comments.

20 Claims, 10 Drawing Sheets

(56) References Cited

OTHER PUBLICATIONS

"U.S. Appl. No. 12/766,697, Response filed Apr. 17, 2013 to Non Final Office Action mailed Jan. 17, 2013", 11 pgs.
"U.S. Appl. No. 12/766,697, Response filed Oct. 1, 2012 to Final Office Action mailed Jul. 31, 2012".
"U.S. Appl. No. 12/766,697, Advisory Action mailed Oct. 12, 2012", 3 pgs.
"U.S. Appl. No. 12/766,697, Advisory Action mailed Nov. 6, 2012", 3 pgs.
"U.S. Appl. No. 12/766,697, Decision on Pre-Appeal Brief Request mailed Aug. 27, 2013", 2 pgs.
"U.S. Appl. No. 12/766,697, Decision on Pre-Appeal Brief Request mailed Nov. 5, 2012", 2 pgs.
"U.S. Appl. No. 12/766,697, Final Office Action mailed Jun. 13, 2013", 17 pgs.
"U.S. Appl. No. 12/766,697, Final Office Action mailed Jul. 31, 2012", 16 pgs.
"U.S. Appl. No. 12/766,697, Non Final Office Action mailed Jan. 17, 2013", 16 pgs.
"U.S. Appl. No. 12/766,697, Non Final Office Action mailed Dec. 16, 2011", 13 pgs.
"U.S. Appl. No. 12/766,697, Notice of Allowance mailed Dec. 17, 2013", 11 pgs.
"U.S. Appl. No. 12/766,697, Pre-Appeal Brief Request filed Oct. 26, 2012", 5 pgs.
"U.S. Appl. No. 12/766,697, Pre-Appeal Brief Request for Review mailed Aug. 15, 2013", 4 pgs.
"U.S. Appl. No. 12/766,697, Response filed Mar. 16, 2012 to Non Final Office Action mailed Dec. 16, 2011", 10 pgs.

* cited by examiner

Human Agreement Curve on Clustering Accuracy

SUMMARIZATION OF SHORT COMMENTS

RELATED MATTERS

This application is a continuation of U.S. patent application Ser. No. 12/766,697, filed on Apr. 23, 2010, and entitled "Summarization of Short Comments" now U.S. Pat. No. 8,713,017 issued on Apr. 29, 2014, which claims the priority benefit of U.S. Provisional Application No. 61/172,151, filed Apr 23, 2009, and entitled "Rated Aspect Summarization of Short Comments," which are both incorporated herein by reference.

TECHNICAL FIELD

The present application relates generally to the technical field of information management and, in one specific example, to summarization of short comments.

BACKGROUND

Websites allow users to contribute and receive information. For example, people comment on various entities such as sellers, products and services. These user-contributed comments, in turn, educate other users and drive traffic to the website. Generally, given a target entity, many user-generated short comments are received. Each of these comments may include an overall rating. For example, users may review and rate products on websites such as CNET using one to five stars. On another website, such as eBay, buyers leave feedback comments to the seller and rate the transaction as positive, neutral, or negative. Usually, the number of comments about a target entity numbers in the hundreds or thousands. This number is constantly growing as more and more people contribute more comments.

BRIEF DESCRIPTION OF THE DRAWINGS

Some embodiments are illustrated by way of example and not limitation in the figures of the accompanying drawings in which.

DETAILED DESCRIPTION

Example methods and systems to summarize short comments are described. In the following description, for purposes of explanation, numerous specific details are set forth in order to provide a thorough understanding of example embodiments. It will be evident, however, to one skilled in the art that the present invention may be practiced without these specific details.

Figure 1:
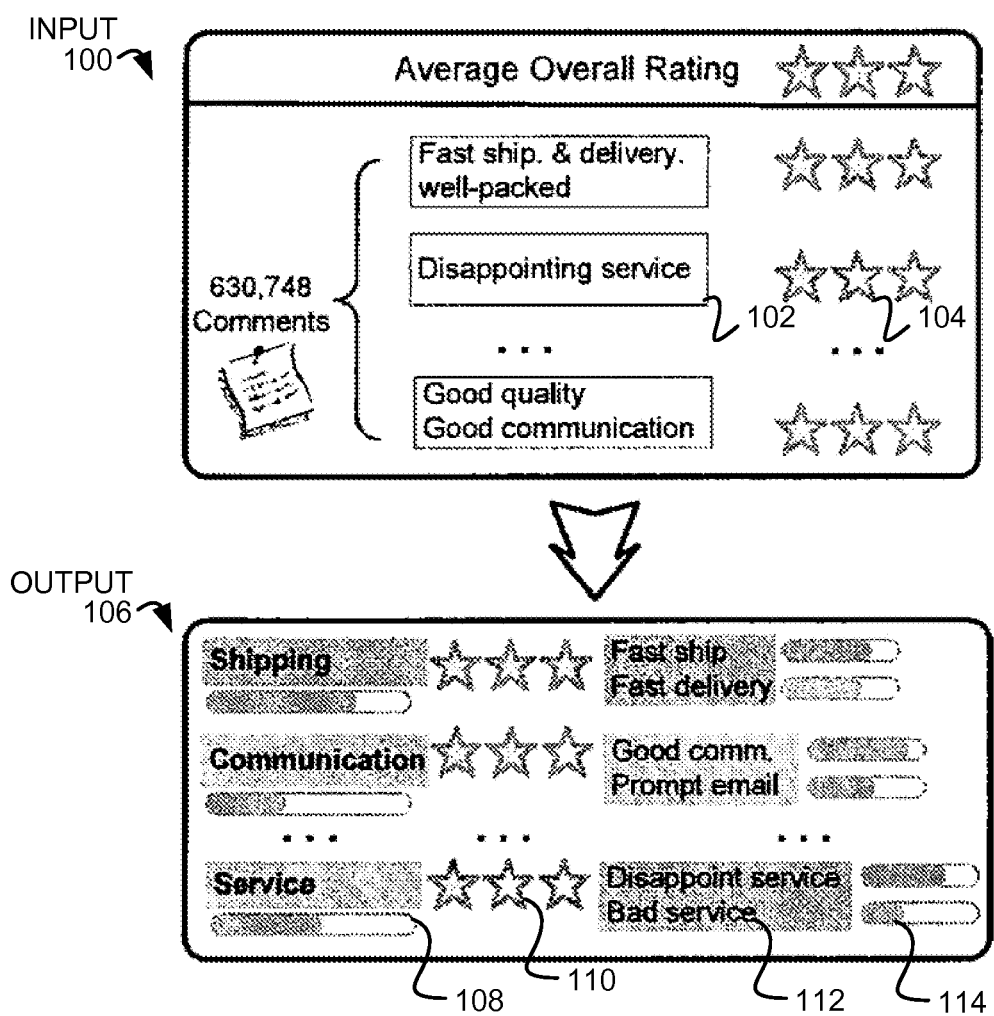
FIG. 1 is a depiction of an example input and example output of a summarization engine, according to an example embodiment.

FIG. 1 is a depiction of an example input and example output of a summarization engine according to an example embodiment. The example input 100 includes a number of comments 102 (630,748 comments as shown) and the example output 106 includes a rated aspect summary where comments are decomposed into several aspects 108 and each aspect has associated support information (shown as stars 110). More specifically, the input 100 represents the data that a user typically views in a community comments website. This data consists of a large number of comments 102, each having companion overall ratings 104. Using such data, the user can only get an overall impression by looking at the average overall rating. The summarization engine described herein generates the output 106, which comprises a rated aspect summary that, in turn, provides the decomposed overall ratings (e.g., stars 110) of the rated aspects 108, so that a user can gain different perspectives towards a target entity. This kind of the decomposition is quite useful because differing users may have different needs and the overall ratings are generally not tailored to satisfy those needs. For example, a prospective eBay buyer may compromise on shipping time but not on product quality. In this case, it is not sufficient for the buyer to just know the overall rating of the seller, and it would be highly desirable for the buyers to know the ratings are based on a specific aspect about product quality.

The output 106 shows the overall rating is being decomposed into several rated aspects 108, such as shipping communication and service. Each aspect has support information shown by the stars 110. Additionally, representative phrases 112 with support information (e.g., bars 114) are included with the rated aspects 108, and can serve as indices to navigate into a set of specific comments about a particular aspect.

The rated aspect summarization may be helpful even when users explicitly provide ratings for a given aspect. For example, it may be desirable to further decompose the aspect into sub-aspects. To illustrate, people typically rate "food" in restaurant reviews, but users usually want to know in what sense the food was "good" or "bad." For example. a particular user may be concerned more about healthiness than about taste. In other instances, the given aspects may not cover all of the major aspects discussed in the text comments. For example, in the eBay system, there are four defined aspects to rate a seller, namely, "item as described," "communication," "shipping time," and "shipping and handling charges." It would be difficult to know the seller's performance on aspects such as "packaging," "price," or "service," which may be useful to some potential buyers.

To provide rated aspect summaries, a summary engine first extracts major aspects from comments in a collection and then predicts a rating for each aspect from the overall ratings. Finally, the summarization engine extracts representative phrases from the short comments.

In particular, the embodiments described here generate a rated aspect summary (i.e., a summary with a rating for each aspect) in order to help users better comprehend the comments along different dimensions of the target entity given a large number of short comments about the target entity, where each comment is associated with an overall rating indicating an overall opinion about the target entity. There are two different scenarios. The first scenario is without supervision where there is no prior knowledge of the aspects. The aspects are automatically decomposed from the overall rating into purely ad hoc aspects based on the data. In a second scenario, using minimum supervision, the user provides keywords specifying aspects of interest and those aspects are accommodated.

Some definitions referred to herein include:

The collection of short comments is denoted by $T=\{t_1, t_2, \ldots\}$, where each short comment t is an element of the comments collection T ($t \in T$) and is associated with an overall rating r(t).

An overall rating r(t) of a comment t is a numerical rating indicating different levels of overall opinion contained in comment t, the rating is a value between a predefined minimum value and a predefined maximum value ($r(t) \in \{r_{min}, \ldots, r_{max}\}$). Usually, it is infeasible for a user to review the overall ratings of a large number of comments.

The average overall rating of a collection of comments R(T) is a score averaged over all of the overall ratings expressed as:

$$R(T) = \frac{\sum_{t \in T} r(t)}{|T|} \in [r_{min}, r_{max}]$$

A phrase $f=(w_m, w_h)$ is in the form of a pair of head term ($w_h$) and modifier ($w_m$). Usually the head term is an aspect or feature, and the modifier expresses some opinion about this aspect. In short comments, such as feedback text, most opinions are expressed in concise phrases, such as "well packaged," "excellent seller." Using shallow parsing techniques, those phrases are extracted to identify the head term and the modifier.

Each comment is represented by a bag of phrases ($t=\{f=(w_m, w_h)|f \in t\}$) instead of a bag of words. The rated aspect summarization includes three steps: identify a number (k) of major "aspect clusters," predict an "aspect rating" for each aspect, and extract "representative phrases" to support or explain the aspect ratings. These concepts are defined herein as follows:

An aspect cluster ($A_i$) is a cluster of head terms ($w_h$) that share similar meaning in the given context. Those words jointly represent an aspect that users comment on and/or are of interest to users. The aspect cluster is denoted as $A_i=\{w_h|A(w_h)=i\}$, where A(.) is a mapping function from some aspect clustering algorithm that maps a head term to a cluster label.

An aspect rating ($R(A_i)$) is a numerical measure with respect to the aspect $A_i$, showing the degree of satisfaction demonstrated in the comments collection T toward this aspect, and $R(A_i) \in [r_{min}, \ldots, r_{max}]$.

A representative phrase $rf=(f, s(f))$ is a phrase f with a support value s(f), where $s(f) \in [1, \infty)$ indicating how many phrases in the comments that this phrase can represent.

Note that r(.) is used to denote a discrete rating (an integer between $r_{min}$ and $r_{max}$), and R(.) is used to denote an average rating over a number of discrete ratings, which is a rational number (usually non-integer) between $r_{min}$ and $r_{max}$.

A rated aspect summary is a set of tuples expressed as:

$(A_i, R(A_i), RF(A_i))_{i=1}^k$ where $A_i$ is a ratable aspect, $R(A_i)$ is the predicted rating on $A_i$, and $RF(A_i)$ is a set of representative phrases in this aspect.

Figure 2:
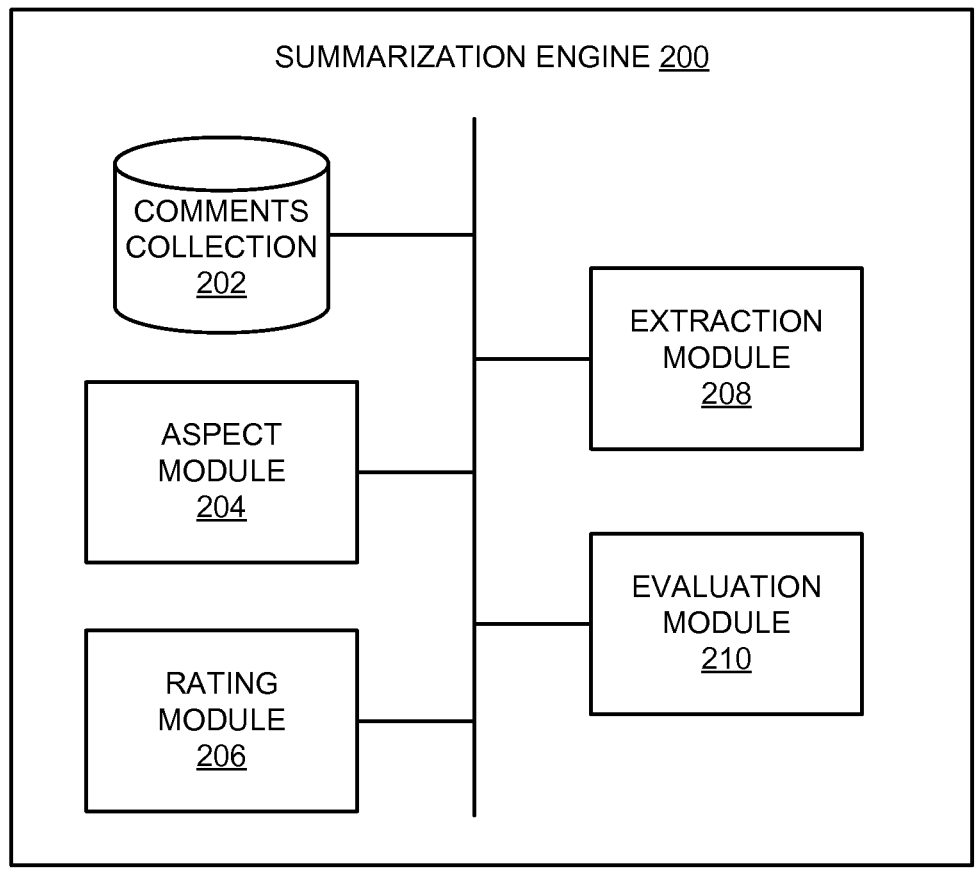
FIG. 2 is a block diagram of a summarization engine, according to various embodiments.

FIG. 2 is a block diagram of a summarization engine 200 according to various embodiments. The summarization engine 200 comprises (or has access to) a comments collection 202, an aspect module 204, a rating module 206, an extraction module 208, and an optional evaluation module 210. The summarization engine 200 summarizes short comments about a target entity.

The short comments are stored in a comments collection 202 and can be accessed by the summarization engine 200. The short comments may include seller feedback, customer reviews, and comments on content (e.g., blogs, new articles, etc.) about a target entity.

The aspect module 204 is used to identify a number k of aspects and to cluster head terms into those aspects. The short comments include opinions on different aspects that, in turn, are usually expressed as concise phrases. Each phrase f is parsed into a pair of head terms, $w_h$, and modifier terms, $W_m$, in the form of $f=(w_m, w_h)$. Usually the head term, $w_h$, is about an aspect or feature of the target entity, and the modifier expresses some opinion towards this aspect. The aspect module 204 may use a number of techniques to identify and cluster aspects. Three examples of these techniques are discussed in greater detail in connection with FIG. 3.

The rating module 206, once the k aspect clusters of head terms are identified by the aspect module 204 in the form of a clustering mapping function A(.), predicts the rating for each aspect from the overall rating. The rating module 206 may use a variety of techniques for classifying each phrase f into a rating r(f) having the same scale as the overall ratings. The aspect ratings are, in turn, calculated by aggregating ratings of the phrases within each aspect. Example techniques that may be used are described more fully in connection with FIG. 4.

The extraction module 208 extracts representative phrases from the comments in order to provide the users with some textual clues for better understanding of the predicted aspect rating. If the aspect clusters and aspect rating predictions are accurate, the phrases that are classified into the same aspect and same rating are similar to one another. In these cases, the comments collection T is segmented into subsets of phrases F for each aspect $A_i$ and each rating value r, and $F(A_i, r) = \{f | A(f) = i, r(f) = r\}$ expressed as:

Using the segmented phrases, the top three phrases with the highest frequency in each subset are extracted. The support value for a phrase f is the frequency of the phrase in the subset, expressed as:

where c is a function to determine the number of co-occurrences of the phrase f in $s(f) = c(f, F(A_i, r))$ the subset of phrases F.

The optional evaluation module 210 is to evaluate the performance of the aspect module 204, the rating module 206, and the extraction module 208. In some instances, the resulting aspects, ratings, and extracted phrases are compared to an existing set of ratings, aspects and extracted phrases. The evaluation module 210 is discussed in greater detail in connection with FIG. 5.

Figure 3:
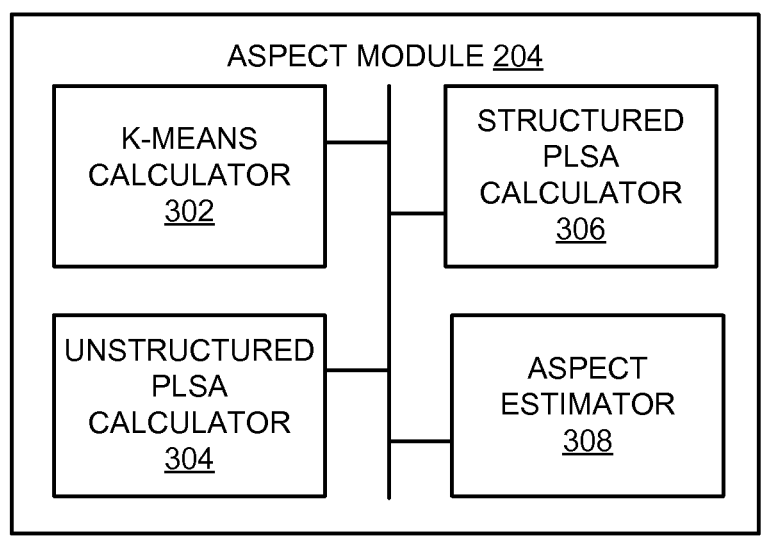
FIG. 3 is a block diagram of an aspect module, according to various embodiments.

FIG. 3 is a block diagram of an aspect module 204, according to various embodiments. The aspect module 204 comprises a k-means calculator 302, an unstructured probabilistic latent semantic analysis (PLSA) calculator 304, a structured PLSA calculator 306, and an aspect estimator 308.

The k-means calculator 302 is to apply a k-means standard clustering algorithm to a set of vectors of head terms. The k-means standard clustering algorithm may be used, in part, because the structure of phrases may be used in the clustering of the terms. To illustrate, if two head terms tend to be associated with the same set of modifiers, the head terms may share similar meaning. For example, head terms that are usually modified by "fast" should be more similar to one another $$v(w_h) = (c(w_h, w_m^1), c(w_h, w_m^2), \ldots)$$

than head terms modified by "polite" or "honest." In some instances, the relation between modifiers is used by representing each of the head terms $w_h$ as a vector $v(w_h)$ in the form of where $c(w_h, w_m^1)$ is the number of co-occurrences of head term $w_h$ with modifier $w_m^i$. The k-means clustering algorithm is then applied to the vector. The clusters output by k-means are used as the aspects of interest. K-means clustering is a statistical and machine learning technique for clustering or partitioning a group of n observations or objects into k clusters in which each observation or object belongs to one of the k clusters with the nearest mean or a computed average of the distance between observations or objects in the cluster.

The unstructured PLSA calculator 304 provides an alternate or additional way to identify aspects or clusters of aspects from the short comments. By applying the PLSA algorithm to head terms in unstructured texts, aspects can be extracted. Generally, a unigram language model (i.e., a multinomial word distribution) is used to model a topic. For example, a distribution that assigns high probabilities to words such as "shipping," "delivery," and "days," may indicate a topic such as "shipping time." In order to identify multiple aspects in text, a mixture model involving multiple multinomial distributions may be fit to the text data. The mixture model may also be used to determine the parameters of the multiple word distribution so that the likelihood of the text data is maximized.

A number k of unigram language models are defined as $\Theta = \{\theta_1, \theta_2, \ldots, \theta_k\}$ as k theme models, each being a multinomial distribution of head terms, capturing one aspect. A comment $t \in T$ may be regarded as a sample of the mixture model:

$$p_t(w_h) = \sum_{j=1}^{k} [\pi_{t,j} p(w_h | \theta_j)]$$

where $w_h$ is a head term, $\pi_{t,j}$ is a comment-specific mixture weight for the j-th aspect, which is represented as:

$$\sum_{j=1}^{k} \pi_{t,j} = 1$$

The log-likelihood of the collection T is calculated by:

$$\log p(T | A) = \sum_{t \in T} \sum_{w_h \in V_h} \left\{ c(w_h, t) \times \log \sum_{j=1}^{k} [\pi_{t,j} p(w_h | \theta_j)] \right\}$$

where $V_h$ is the set of all head terms, $c(w_h, t)$ is the count of the head term $w_h$ comment t, and A is the set of all model parameters.

The model can be estimated using any estimator. For example, the Expectation-Maximization (EM) algorithm can be used to compute a maximum likelihood estimate with the following updating formulas:

$$p(z_{t,w_h,j}) = \frac{\pi_{t,j}^{(n)} p^{(n)}(w_h | \theta_j)}{\sum_{j'=1}^{k} \pi_{t,j'}^{(n)} p^{(n)}(w_h | \theta_{j'})}$$

$$\pi_{t,j}^{(n+1)} = \frac{\sum_{w_h \in V_h} c(w_h, t) p(z_{t,w_h,j})}{\sum_{j'} \sum_{w_h \in V_h} c(w_h, t) p(z_{t,w_h,j'})}$$

$$p^{(n+1)}(w_h | \theta_j) = \frac{\sum_{t \in T} c(w_h, t) p(z_{t,w_h,j})}{\sum_{w_h' \in V_h} \sum_{t \in T} c(w_h', t) p(z_{t,w_h',j})}$$

where $p(z_{t,wh,j})$ represents the probability of head term $w_h$ in comment t assigned to the jth aspect.

A set of theme models may be extracted from the text collection $\{\theta_i | i=1, \ldots, k\}$, and each head term $w_h \in V_h$ is grouped into one of k aspects by selecting the theme model with the largest probability of generating $w_h$, which is a clustering mapping function:

$$A(w_h) = \underset{j}{\operatorname{argmax}} p(w_h | \theta_j)$$

If two head terms tend to co-occur with each other (such as "ship" and "delivery" co-occurring in "fast ship and delivery") and one term is assigned a high probability, then the other generally is also assigned a high probability in order to maximize the data likelihood. Thus, the unstructured PLSA calculator 304 generally captures the co-occurrences of head terms and may cluster the head terms into aspects based on co-occurrences in comments.

The structured PLSA calculator 306 incorporates the structure of phrases into the PLSA model using co-occurrence information of head terms and their modifiers. A number k of unigram language models is defined as $\Theta = \{\theta_1, \theta_2, \ldots, \theta_k\}$ as k theme models. Each modifier term is represented by a set of head terms that it modifies:

$$d(w_m) = \{w_h | (w_m, w_h) \in T\}$$

which is regarded as a sample of the mixture model:

$$p_{d(w_m)}(w_h) = \sum_{j=1}^{k} [\pi_{d(w_m),j} p(w_h | \theta_j)]$$

where $\pi_{d(wm),j}$ is a comment-specific mixture weight for the j-th aspect, which sums $$\sum_{j=1}^{k} \pi_{d(w_m),j} = 1$$

to one and is represented as:

$$\log p(V_m | A) = \sum_{w_m \in V_m} \sum_{w_h \in V_h} \{c(w_h, d(w_m)) \times \log \sum_{j=1}^{k} [\pi_{d(w_m),j} p(w_h | \theta_j)]\}$$

The log-likelihood of the collection of modifiers $V_m$ is:
where $c(w_h, d(w_m))$ is the number of co-occurrences of head term $w_h$ with modifiers $w_m$, and A is the set of all model parameters. Using a similar EM algorithm as the unstructured PLSA calculator 304, the k theme models are estimated and the clustering mapping function is obtained. For completeness, the updating formulas $$p(z_{d(w_m),w_h,j}) = \frac{\pi^{(n)}_{d(w_m),j} p^{(n)}(w_h | \theta_j)}{\sum_{j'=1}^{k} \pi^{(n)}_{d(w_m),j'} p^{(n)}(w_h | \theta_{j'})}$$

$$\pi^{(n+1)}_{d(w_m),j} = \frac{\sum_{w_h \in V_h} c(w_h, d(w_m)) p(z_{d(w_m),w_h,j})}{\sum_{j'} \sum_{w_h \in V_h} c(w_h, d(w_m)) p(z_{d(w_m),w_h,j'})}$$

$$p^{(n+1)}(w_h | \theta_j) = \frac{\sum_{w_m \in V_m} c(w_h, d(w_m)) p(z_{d(w_m),w_h,j})}{\sum_{w'_h \in V_h} \sum_{w_m \in V_m} c(w'_h, d(w_m)) p(z_{d(w_m),w'_h,j})}$$

follow:
where $p(z_{d(wm),wh,j})$ represents the probability of head term $w_h$ associated with the modifier $w_m$ assigned to the jth aspect.

Relative to the unstructured PLSA calculator 304, the structured PLSA calculator 306 models the co-occurrence of head terms at the level of the modifiers used instead of at the level of comments that occur. In contrast, the structured PLSA calculator 306 organizes the head terms by their modifiers.

The aspect estimator 308 incorporates domain knowledge about the aspects. For instance, "food" and "service" are major aspects in comments about restaurants. And sometimes a user may have specific preference on some aspects. For example, a buyer may be especially interested in the "packaging" aspect. In the probabilistic model framework, a conjugate prior may be used to incorporate such human knowledge to guide the clustering of aspects.

Specifically, a unigram language model $\{p(w_h|a_j)\}_{Wh \in Vh}$ is built for each aspect that is associated with some prior knowledge. For example, a language model for a "packaging" aspect may look like:

$p(\text{packaging}|a_1) = 0.5$ $p(\text{wrapping}|a_1) = 0.5$

A conjugate prior (i.e., a Dirichlet prior) is defined on each unigram language model, parameterized as:

$\text{Dir}(\{\sigma_j p(w_h|a_j)+1\}_{w_h \in V_h})$ where $\sigma_j$ is a confidence parameter for the conjugate prior. Since a conjugate prior is used, $\sigma_j$ is interpreted as the "equivalent sample size," which means that the effect of adding the conjugate prior would be equivalent to adding $\sigma_j p(w_h|a_j)+1$ pseudo counts for head term $w_h$ when the topic model $p(w_h|\theta_j)$ is estimated. Basically, the conjugate prior serves to bias the clustering results.

The prior for all the parameters is given by:

$$p(\Lambda) \propto \prod_{j=1}^{k} \prod_{w_h \in V_h} p(w_h | \theta_j)^{\sigma_j p(w_h|a_j)}$$

where $\sigma_j = 0$ if there is no prior knowledge about some aspect $\theta_j$.

The Maximum A Posterioi (MAP) estimator is used to estimate all the parameters as follows (for unstructured PLSA and structured PLSA, respectively):

$$\hat{\Lambda} = \arg\max_{\Lambda} p(T | \Lambda) p(\Lambda)$$

$$\hat{\Lambda} = \arg\max_{\Lambda} p(V_m | \Lambda) p(\Lambda)$$

The MAP estimate is computed using essentially the same EM algorithm using modified updating formulas for the component language models as follows (for unstructured and structured PLSA calculations, respectively):
and $$p(w_h | \theta_j)^{(n+1)} = \frac{\sum_{w_m \in V_m} c(w_h, d(w_m)) p(z_{d(w_m),w_h,j}) + \sigma_j p(w_h | a_j)}{\sum_{w'_h \in V_h} \sum_{w_m \in V_m} c(w'_h, d(w_m)) p(z_{d(w_m),w'_h,j}) + \sigma_j}$$

Figure 4:
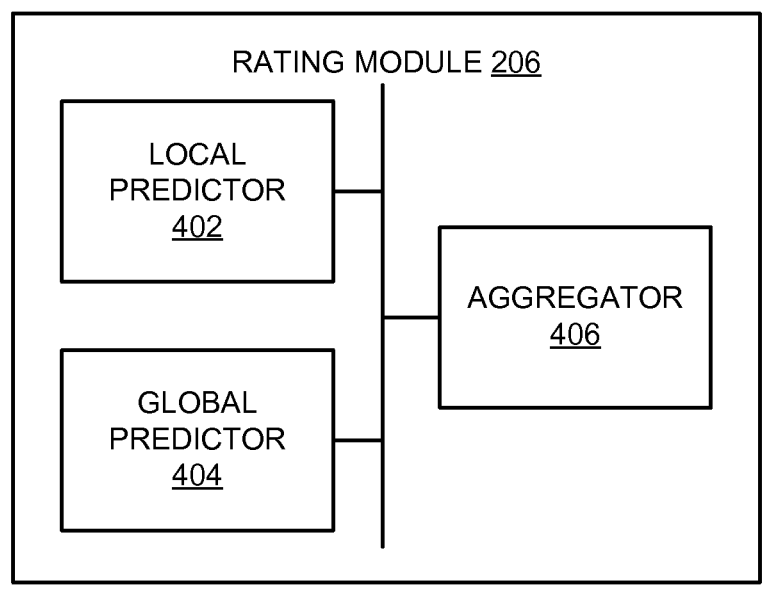
FIG. 4 is a block diagram of a rating module, according to various embodiments.

FIG. 4 is a block diagram of a rating module 206, according to various embodiments. The rating module 206 predicts the rating for the aspects identified by the aspect module 204 of FIG. 3 from the overall rating associated with each of the short comments. The rating module 206 uses two or more techniques to classify each phrase f into a rating r(f) based the same scale as the overall ratings. The aspect ratings are calculated by aggregating ratings of the phrases within each aspect. The rating module 206 comprises a local predictor 402, a global predictor 404 and an aggregator 406.

The local predictor 402 uses the local information (i.e., the overall rating of the exact comment in which a particular phrase appears) associated with the comment. The technique used by the local predictor 402 is based on an assumption that an overall rating given by a user is consistent with what is written in the comment. In this technique, each phrase in a given short comment is assigned the same rating as the overall rating of the comment. Expressed mathematically, the rating classifier for a phrase is:

$r(f \in t) = r(t) \in \{r_{min}, \ldots, r_{max}\}$

The global predictor 404 learns rating level classifiers using global information of the overall ratings of all comments. The global predictor 404 classifies each phrase by the globally learned rating classifier. Specifically, for each aspect $A_i$, $r_{max} - r_{min} + 1$ rating models are estimated empirically, each corresponding to a rating value $r \in \{r_{min}, \ldots, r_{max}\}$. Each rating model is a unigram $$p(w_m | A_i, r) = \frac{c(w_m, S(A_i, r))}{\sum_{w'_m \in V_m} c(w'_m, S(A_i, r))}$$

language model of modifiers capturing the distribution of modifiers with the given rating value. The rating value model is estimated by the empirical distribution:
where
is a subset of phrases that belong to this aspect, and comments containing these phrases receive the overall rating of r. Each phrase can then be classified by $S(A_i, r) = \{f | f \in t, A(f) = i, \text{ and } r(t) = r\}$ choosing the rating class that has the highest probability of generating the modifier in that phrase. This may be considered to be a Naïve Bayes classifier with uniform $$r(f) = \underset{r}{\operatorname{argmax}} \{p(w_m | A_i, r) | A(f) = i\}$$

prior on each rating class, expressed as:

Intuitively, the rating class supplier of global prediction should work better than that of local prediction. In some cases, not all the phrases in a comment are consistent with the overall rating. It is quite possible that a user will give a high overall rating while mentioning some shortcomings in a comment and vice-versa. Suppose the comments have "slow shipping" rated as a maximum score, local prediction would blindly rate to phrase a maximum score but a global prediction could potentially identify that "slow" is a low rating for the aspect "shipping," because "slow" typically appears in more comments about shipping having a lower rating than in comments having a higher rating.

Once each phrase is classified into a rating value by the local predictor 402 and the global predictor 404, the rating for each aspect $A_i$ is calculated by the aggregator 406. The aggregator 406 aggregates the rating of the phrases that are clustered into the aspect. One way the ratings can be aggregated is to calculate the average rating of phrases within this aspect according to the formula:

$$R(A_i) = \frac{\sum_{A(f)=i} r(f)}{|\{f | A(f) = i\}|}$$

where $R(A_i)$ is a value between $r_{min}$ and $r_{max}$, representing the average rating of this aspect.

Figure 5:
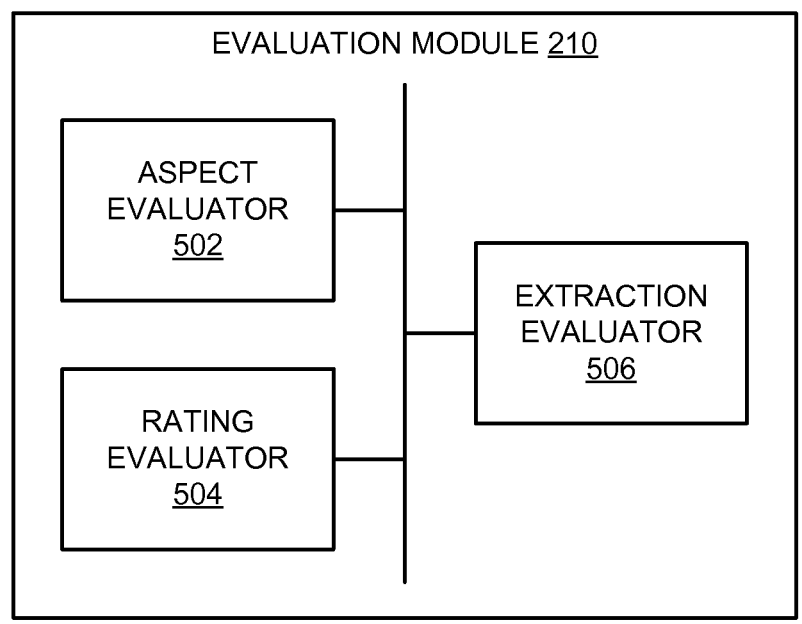
FIG. 5 is a block diagram of an evaluation module, according to various embodiments.

FIG. 5 is a block diagram of an evaluation module 210, according to various embodiments. The evaluation module 210 is used to evaluate the accuracy of the ratings predictions.

A dataset is created by collecting feedback comments for 28 sellers on eBay with high feedback scores over the past year. The feedback score of a seller is defined as the cumulative number of positive feedback received. After each transaction, the buyer is supposed to leave some feedback for the seller including: an overall rating is positive, neutral or negative; detailed seller ratings (DSRs), on four given aspects: "item as described," "communication," "shipping time," and "shipping and handling charges" on a scale of five stars; and some short comments in free text.

For preprocessing, the part of speech (POS) tagging and chunking function of the open natural language processor (NLP) toolkit is used to identify phrases in the form of a pair of head term and modifier. Statistics about the dataset is provided in Table 1 below:

TABLE 1

Statistics of the Data Set

| Statistics | Mean | STD |
|---|---|---|
| # of comments per seller | 57,055 | 62,395 |
| # of phrases per comment | 1.5533 | 0.0442 |
| overall rating (positive %) | 0.9799 | 0.0095 |

Based on these statistics, a few observations can be made. First, those sellers with high feedback scores receive a large number of comments, 57,055 comments on average. But the number also varies across different sellers, as the standard deviation is very high. Second, buyers usually only use a few phrases in each comment. After parsing there are about 1.5 phrases per comment. Note that, the original data is noisier. For example, the user-invented superlative "AAA+++" does not provide much detailed information on aspects. The preprocessing reduces the data by about 40% in terms of the number of tokens. Third, the overall average overall ratings are usually very high, nearly 0.98 of comments are positive, so they are not discriminative.

A sample rated aspects summarization of one of the sellers is shown in Table 2, below.

TABLE 2

A Sample Result of Rated Aspect Summarization

| No. | Aspects | Ratings | Phrases of Rating 1 | Phrases of Rating 0 |
|---|---|---|---|---|
| 1 | described, promised | 4.8457 | as described (3993) as promised (323) as advertised (149) | than expected (68) than described (43) i ordered (10) |
| 2 | shipped, arrived | 4.3301 | quickly shipped (162) great thanks (149) quickly arrived (138) | open box (39) wrong sent (29) back sent (15) |
| 3 | recommended, was | 3.9322 | highly recommended (236) highly recommend (115) exactly was (84) | back be (42) defective was (40) not have (37) |
| 4 | shipping, delivery | 4.7875 | fast shipping (5354) quick shipping (879) fast delivery (647) | good shipping (170) slow shipping (81) reasonable shipping (32) |
| 5 | transaction, item | 4.6943 | great item (1017) great transaction (704) smooth transaction (550) | wrong item (70) new condition (48) new item (34) |
| 6 | seller, product | 4.9392 | great seller (2010) great product (1525) good seller (866) | poor communication (12) defective product (12) personal comm (9) |
| 7 | works, price | 4.3830 | great works (1158) great price (642) good price (283) | perfectly works (132) fine works (90) not working (29) |
| 8 | buy, do | 4.0917 | will buy (356) would buy (347) again buy (271) | not did (105) not work (91) didnt work (49) |

The first column of Table 2 shows automatically discovered and clustered aspects using structured PLSA. The number of aspects is empirically set to eight. The top two head terms in each aspect are displayed as the aspect label. The second column is the predicted ratings for different aspects using global prediction. Due to the mostly positive nature of the feedback, both neutral and negative feedback are assigned a rating of zero, and positive feedback is assigned a rating of one. The predicted ratings for each aspect are a value between zero and one. Then, the predicted ratings are mapped uniformly to the five-star ratings to produce a score between zero and five as in the second column of the table. The last two columns show three representative phrases together with their frequency for each aspect and for rating one and zero respectively.

Based on the summarization, a few observations are made. First, that the major aspects can be discovered and clustered around head terms in a meaningful way. Aspect 1 is about whether the seller truly delivers as promised; aspect 3 shows whether the buyers would recommend seller; aspect 7 pertains to price. Almost all aspects are coherent and separable except that aspect 2 and aspect 4 both pertain to "shipping time." Second, the aspect ratings provide some insight towards the seller's performance on the different aspects. Third, although some phrases are noisy, such as "not did" and "I ordered," and some phrases are misclassified into ratings, such as "new condition" and "new item" being misclassified into the rating 0 class, a majority of the phrases informative and indicate the correct ratings. In addition, the frequency counts allow users to determine whether these opinions are representative of the major opinions. Fourth, there is some correlation between the predicted aspect ratings and the phrase frequency counts. Usually, a high aspect rating maps to a large number of phrases and a rating of 1 while a low aspect rating maps to a small number of phrases and a rating of 0.

A sample comparison of two sellers is shown in Table 3. For brevity, only a part of the summary is displayed. Although the two sellers have a very similar overall rate (98.66% positive, versus 98.16% positive), seller 1 is better at providing good shipping while seller 2 is stronger at good communication. This table provides more detailed information than the overall ratings and shows one benefit of decomposing an overall rating into aspect ratings.

TABLE 3

Sample Comparison of Two Sellers

| Aspects | Seller1 | Seller2 |
|---|---|---|
| OVERALL | 98.66% | 98.16% |
| described | 4.7967 | 4.8331 |
| communication | 4.5956 | 4.9462 |
| shipping | 4.9131 | 4.2244 |

An aspect evaluator 502 is used to quantitatively evaluate the effectiveness of aspect discovery and clustering. The aspect evaluator 502 measures both aspect coverage and clustering accuracy.

To evaluate the aspects and clusters generated by the aspect module 204 of FIG. 3, a standard dataset is created by users. For each seller and no more than 100 head terms are displayed that each, in turn, have support for no less than 0.1% of the comments (for typical seller, there are about 80 terms). The term frequency and five most frequent phrases are also displayed. The example for the aspect "price" is 608, 0.012, "great price," "good price," "fair price," "nice price," and "reasonable price." More specifically, the head term is "price," which appears 608 times in the seller's feedback comments (i.e., term count), accounting for 1.2% of all head terms (i.e., term frequency). The most frequent phrases with this head term are "great price," "good price," "fair price," "nice price," and "reasonable price." These phrases are displayed, in part, to provide the user with some context for clustering the head terms in case there is any ambiguity. The users are then asked to cluster the head terms into no more than eight clusters based on their meanings. If more than eight clusters are formed, the user preserves the top eight clusters with highest support. Some head terms that do not look like aspects (e.g., because of parsing errors) or that do not fit into top eight clusters are ignored.

Aspect coverage is used to measure how much an aspect clustering algorithm is able to recover the major aspects that the users have identified. If the most frequent term in an algorithm output cluster matches one of the terms in the human identified cluster, it is counted as an aspect match. Top K clusters are the K clusters of the largest size. Then, aspect coverage at top K is defined as the number of aspect matches within top K clusters divided by K.

However, aspect coverage may only evaluate the most frequent term in each cluster (e.g., as the label of a cluster). Aspect coverage does not measure the coherence of terms within the cluster. Therefore, a clustering accuracy algorithm is used to measure the clustering coherence performance. Given a head term $w_h$, let $h(w_h)$ and $A(w_h)$ be the human annotated cluster label and the label generated by some algorithm, respectively. The clustering accuracy is defined as follows:

$$\text{Clustering Accuracy} = \frac{\sum_{w_h \in V_h} \delta(h(w_h), \text{map}(A(w_h)))}{|V_h|}$$

where $|V_h|$ is the total number of head terms, $\delta(x,y)$ is the delta function that equals 1 if x=y and equals zero otherwise, and $\text{map}(A(w_h))$ is the permutation mapping function that maps each cluster label $A(w_h)$ to the equivalent label from the human annotation. One such mapping function is the Kuhn-Munkres algorithm.

Figure 6:
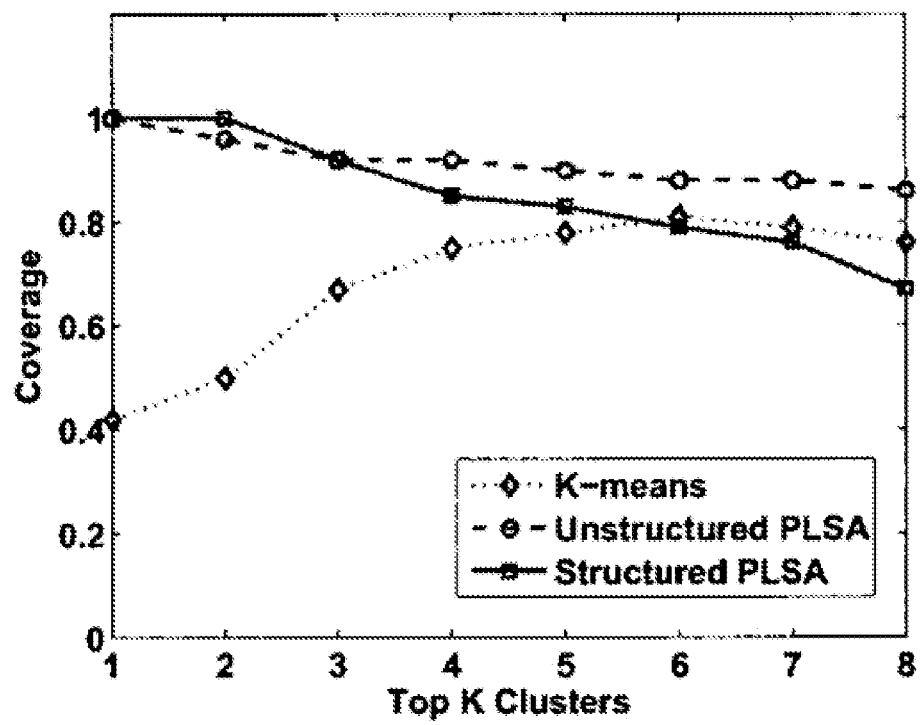
FIG. 6 is a graph depicting sample results of an evaluation of aspect coverage.

The three aspect clustering methods (k-means, unstructured PLSA, and structured PLSA) are compared using aspect coverage and clustering accuracy. FIG. 6 depicts a chart of the aspect coverage in one evaluation of the dataset. As shown in FIG. 6, both probabilistic models, i.e., unstructured PLSA and structured PLSA, are able to identify a small number of the most significant aspects (when K is small). As the number of clusters increases, the performances of the three methods converge to a similar level, around 0.8. This indicates that all of the three methods are able to identify the eight major aspects reasonably well. Table 4, below, includes the results of the cluster accuracy algorithm for each of the aspect clustering methods.

TABLE 4

Evaluation of Cluster Accuracy

| Method | Clustering Accuracy |
|---|---|
| k-means | 0.36 |
| Unstructured PLSA | 0.32 |
| Structured PLSA | 0.52 |

Based on table 4, the structured PLSA method achieves the best performance of clustering accuracy, 0.52, meaning that the clusters are most coherent with respect to user-generated clusters.

Additionally, the degree to which users agree on the coherence in clustering tasks was measured to establish an "upper bound" performance. In this measurement, three users are asked to label the same set of three sellers. Then, the user agreement is evaluated as the clustering accuracy between each pair of users, as shown in table 5 below.

TABLE 5

Human Agreement on Clustering Accuracy

|  | Seller1 | Seller2 | Seller3 | AVG |
|---|---|---|---|---|
| Annot1-Annot2 | 0.6610 | 0.5484 | 0.6515 | 0.6203 |
| Annot1-Annot3 | 0.7846 | 0.6806 | 0.7143 | 0.7265 |
| Annot2-Annot3 | 0.7414 | 0.6667 | 0.6154 | 0.6745 |
| AVG | 0.7290 | 0.6319 | 0.6604 | 0.6738 |

Figure 7:
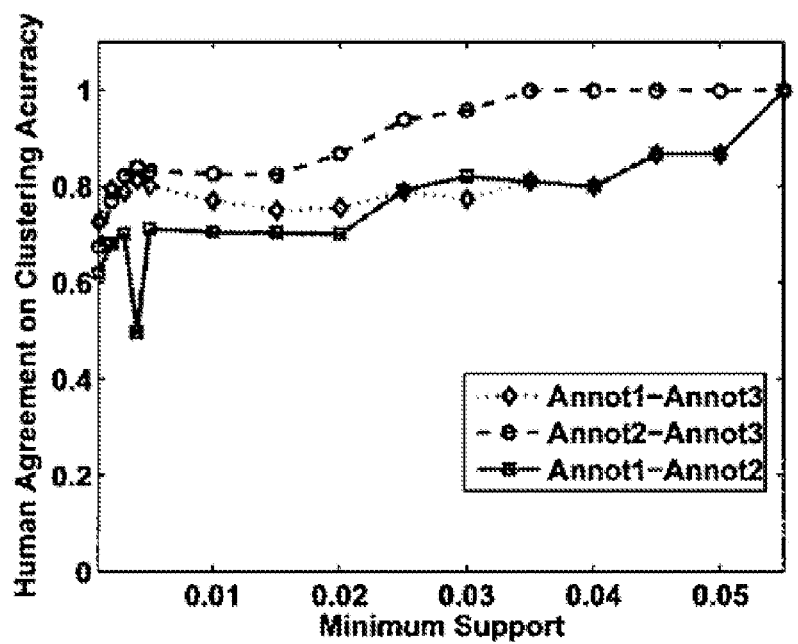
FIG. 7 is a graph depicting a sample human agreement curve of clustering accuracy.

It can be seen that human agreement can vary from 0.5484 to 0.7846, across different annotator pairs and different data. The average agreement is 0.6738. The human agreement curve is plotted with different cutoffs of head term support values in FIG. 7. A higher support value results in a smaller number of head terms. In the three curves of clustering accuracy, denoting three pairs of annotators, the data converges to 1 at a point of support value 5.5%, where there are only three or four terms remaining. Before the point of minimum support, most agreement is still no more than 0.8.

The rating evaluator 504 of FIG. 5 evaluates the rating predictions generated by the rating module 206 of FIG. 4 using an aspect ranking correlation and ranking loss. The evaluation compares the rankings to detailed seller ratings (DSRs) submit by buyers. The descriptions for the four DSR criteria are used as priors when estimating the four aspect models, so that the discovered aspects align with the DSR criteria. Then, the predicted ratings are mapped into a range of [0, 5] in order to allow comparison with the actual DSR ratings provided by buyers. Note that the algorithms do not use any information from the true DSR ratings. Instead, the DSR ratings are predicted based on the comments in the overall ratings. If the algorithms are accurate, the predictions are expected to be similar to the true DSR ratings by the buyers who wrote the comments.

Since the aspect rating prediction also depends on the quality of aspect clusters, the two methods of rating prediction (local prediction and global prediction) are compared using the three different aspect clustering programs. While there is no easy way to incorporate such prior information into the k-means clustering algorithm, the k-means clusters are mapped to four DSR criteria as a post-processing step. To do so, the k-means clusters are aligned to make DSR if that cluster contains the description word of the DSR, if such alignment is not in a DSR, a cluster is randomly selected. A baseline is also included in the comparison using the positive feedback percentage to predict each aspect without extracting aspects from the comments.

To measure the effectiveness of ranking the four DSRs for a given seller, the aspect ranking correlation is determined. For example, a seller may be better at "shipping" than at "communication." Both Kendall's Tau rank correlation and Pearson's correlation coefficient may be used. Ranking loss measures the average distance between the true and predicted rankings. The ranking loss for an aspect is expressed as:

$$\sum_i \frac{|actual\_rating_i - predicted\_rating_i|}{N}$$

where N=28 is the number of sellers. Average ranking loss on K aspects is the average over each aspect. The results are shown in table 6, below, and the best performance of each column is marked in bold font.

TABLE 6

Evaluation Results on Aspect Rating Prediction

| Aspect Clustering | Aspect Prediction | Correlation | | Ranking Loss | | | | | |
|---|---|---|---|---|---|---|---|---|---|
| | | Kendal's Tau | Pearson | DSR1 | DSR2 | DSR3 | DSR4 | AVG of 4 | AVG of 3 |
| baseline | | 0.2892 | 0.3161 | 0.1703 | 0.2053 | 0.3332 | 0.4372 | 0.2865 | 0.2363 |
| k-means | Local Prediction | 0.1106 | 0.1738 | 0.1469 | 0.1925 | 0.3116 | 0.4177 | 0.2672 | 0.2170 |
| k-means | Global Prediction | 0.1225 | −0.0250 | 1.3954 | 0.2726 | 0.3242 | 0.3750 | 0.8668 | 0.6307 |
| Unstructured PLSA | Local Prediction | 0.2815 | 0.4158 | 0.1402 | 0.1439 | 0.3092 | 0.3514 | 0.2363 | 0.1977 |
| Unstructured PLSA | Global Prediction | 0.4958 | 0.5781 | 0.2868 | 0.1262 | 0.2172 | 0.4229 | 0.2633 | 0.2101 |
| Structured PLSA | Local Prediction | 0.1005 | 0.4817 | 0.1229 | 0.1390 | 0.3113 | 0.3420 | 0.2287 | 0.1900 |
| Structured PLSA | Global Prediction | 0.4167 | 0.6118 | 0.0901 | 0.1353 | 0.2349 | 0.5773 | 0.2594 | 0.1534 |

A good prediction is identified by a high correlation and a low ranking loss. As is apparent, the aspect clustering quality affects the prediction of aspect ratings. For example, if k-means is used to cluster the aspects, no matter which prediction algorithm is used, the prediction performance is poor, being below the baseline performance and especially for correlation. Further, the global prediction algorithm performs better than the local prediction algorithm at correlation for both unstructured and structured PLSA aspect clustering. This indicates that the ratings predicted by global prediction are more discriminative and accurate in ranking the four DSRs. Moreover, the ranking loss performance of the methods described for unstructured PLSA and structured PLSA and local prediction or global prediction is almost always better than the baseline. The best ranking loss averaged among the four DSRs is 0.2287 given by structured PLSA and local prediction compared to the baseline of 0.2865. Furthermore, the ranking loss performance also varies across different DSRs. For example, the difference is most significant on DSR 4, which is "shipping and handling charges." However, the problem is that the term "charges" almost never occurs in the comments, so that the aspect clusters estimated using this prior is kind of randomly related to "shipping and handling charges," resulting in the low performance on the prediction for this aspect. If this aspect is excluded in the average is taken of the other three ranking losses, average ranking loss performance of each algorithm improves the best performance is achieved by structured PLSA and global prediction at 0.1534 compared with 0.2365 by the baseline.

The extraction evaluator 506 of FIG. 5 evaluates the precision and recall of the phrases extracted by the extraction module 208 of FIG. 2. To generate a standard for representative phrases, both the true DSR ratings and human annotations are used. The DSR ratings are used to generate candidate phrases at different rating levels based on the assumption that if a buyer provided a low rating (e.g. less than or equal to 3 out of 5) on an aspect, the user will express a negative opinion for this aspect in the text comments. In order to rule out the bias from the aspect clustering algorithm, aspects for the phrases are not distinguished when displaying the phrases to the users. To summarize, the comments with low DSR ratings and high DSR ratings are aggregated separately, and the most frequent 50 phrases in each set are displayed. The user is asked to select the three most frequent phrases for opinions of rating 1 and rating 0 on each of the four aspects. An

TABLE 7

Sample Representative Phrases by Human Annotation

| DSR Criteria | Phrases of Rating 1 | Phrases of Rating 0 |
| --- | --- | --- |
| ITEM AS DESCRIBED | as described (15609) as promised (1282) as expected 487 | than expected (6) |
| COMMUNICATION | great communication (1164) good communication (1018) excellent communication (266) | poor communication (22) bad communication (12) |
| SHIPPING TIME | fast shipping (28447) fast delivery (3919) quick shipping (3812) | slow shipping (251) slow delivery (20) not ship (18) |
| SHIPPING AND HANDLING CHARGES | | excessive postage (10) | example output from the human annotation is shown below in Table 7. The user is given a list of candidates for rating 1 phrases and a list of candidates for rating 0 phrases, and is then asked to fill in the eight cells, as shown in Table 7. In some cases, there are no phrases that fit into some cell. In this instance, the cell is simply left his empty. For example, there are no positive phrases for "shipping and handling charges."

The representative phrases, extraction algorithm is applied in addition to different aspect clustering and rating prediction algorithms, and outputs three phases for each of the eight cells in Table 7. Each cell is treated as a "query," human generated phrases are treated as "relevant documents," and computer generated phrases as "retrieved documents." The precision and recall are calculated to evaluate the information retrieval:

$$\text{Precision} = \frac{|\{\text{relevant\_docs}\} \cap \{\text{docs\_retrieved}\}|}{|\{\text{docs\_retrieved}\}|}$$

$$\text{Recall} = \frac{|\{\text{relevant\_docs}\} \cap \{\text{docs\_retrieved}\}|}{|\{\text{relevant\_docs}\}|}$$

The average precision and average recall are reported in Table 8 based on the user annotation of 10 sellers.

TABLE 8

Evaluation of Representative Phrases

| Methods | Prec. | Recall |
| --- | --- | --- |
| k-means + Local Prediction | 0.3055 | 0.3510 |
| k-means + Global Prediction | 0.2635 | 0.2923 |
| Unstructured PLSA + Local Prediction | 0.4127 | 0.4605 |
| Unstructured PLSA + Global Prediction | 0.4008 | 0.4435 |
| Structured PLSA + Local Prediction | 0.5925 | 0.6379 |
| Structured PLSA + Global Prediction | 0.5611 | 0.5952 |

Note that when the user fills out the cells in the table, the user is also classifying the phrases into the four aspects and removing the phrases that are not associated with the correct rating. As such, phrase extraction is also an indirect way of evaluating the aspect clustering and aspect rating prediction algorithms. Based on Table 8, no matter which of the rating prediction algorithms is used, structured PLSA consistently outperforms unstructured PLSA, and both of which are preferable to k-means. Second, local prediction consistently outperforms global prediction independent of the underlying aspect clustering algorithm. This indicates that local prediction is sufficient and may even be better than global prediction at selecting only a few representative phrases for each aspect. The best performance is achieved by structured PLSA and local prediction at an average precision of 0.5925 and average recall of 0.6379.

Figure 8:
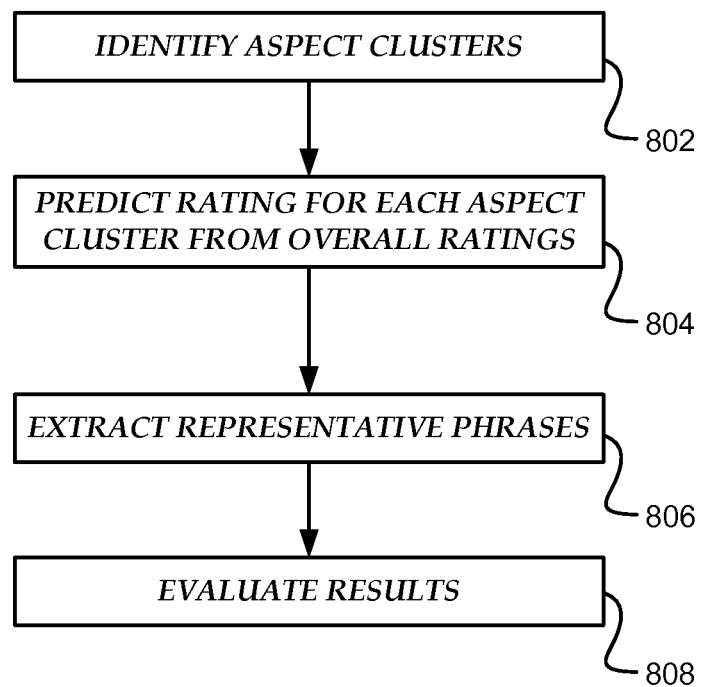
FIG. 8 is a flowchart of a technique for summarizing the short comments, according to various embodiments.

FIG. 8 is a flowchart of a technique 800 for summarizing the short comments according to various embodiments. In a step 802, the aspects of short comments are identified and clustered by, for example, the aspect module 204 of FIG. 3 using k-means, unstructured PLSA, and/or structured PLSA. In a step 804, ratings are predicted for each aspect (or aspect cluster) from the overall rating by, for example, the rating module 206 of FIG. 4 using local prediction and/or global prediction. In a step 806, representative phrases are extracted from the short comments by, for example, the extraction module 208 of FIG. 2. Optional step 808 includes evaluating the results by, for example, the evaluation module 210 of FIG. 5.

Figure 9:
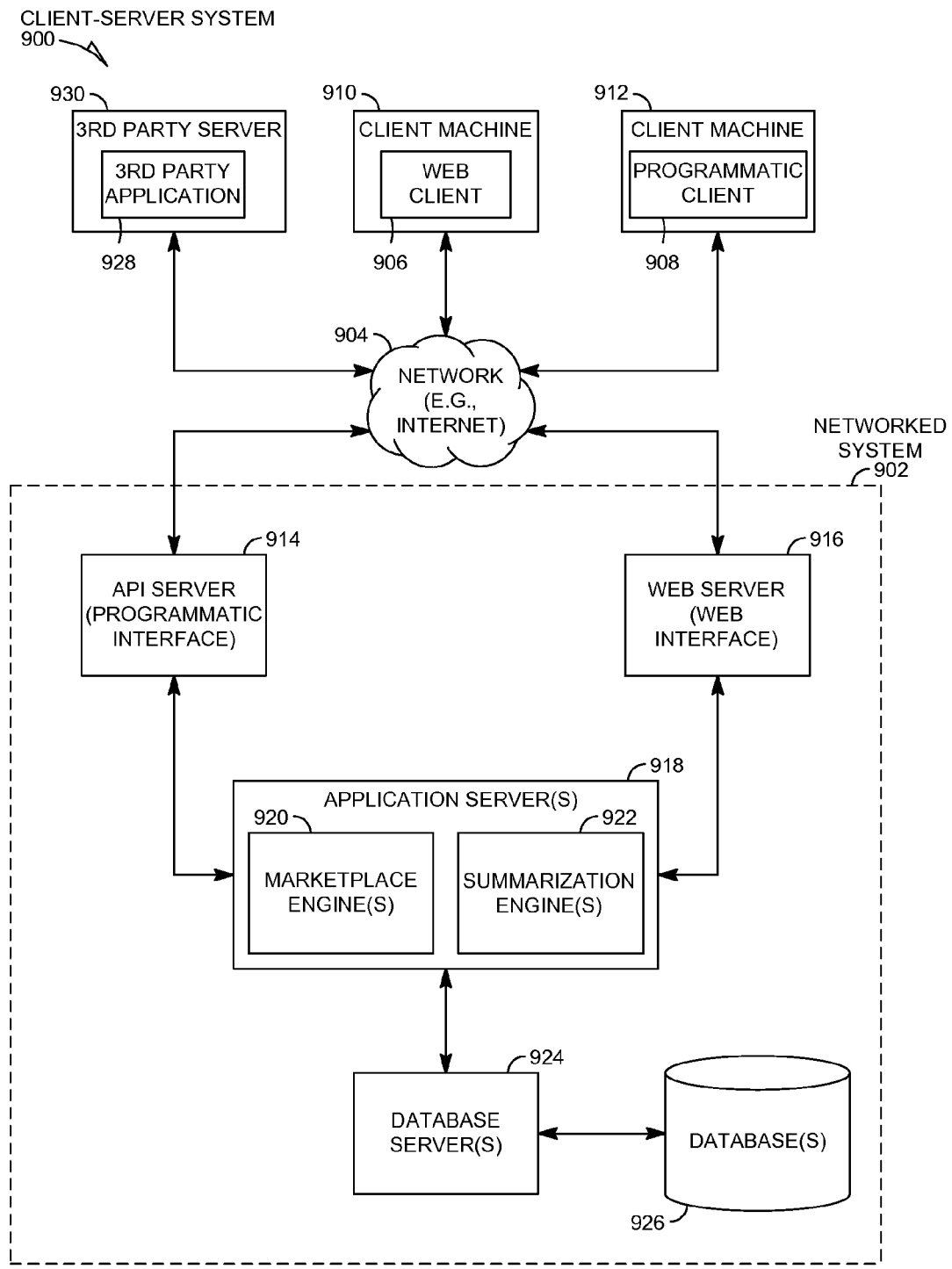
FIG. 9 is a network diagram depicting a client-server system within which one example embodiment may be deployed.

FIG. 9 is a network diagram depicting a client-server system 900, within which one example embodiment may be deployed. A networked system 902, in the example forms of a network-based marketplace or publication system, provides server-side functionality, via a network 904 (e.g., the Internet or Wide Area Network (WAN)) to one or more clients. FIG. 9 illustrates, for example, a web client 906 (e.g., a browser, such as the Internet Explorer browser developed by Microsoft Corporation of Redmond, Wash. State), and a programmatic client 908 executing on respective client machines 910 and 912.

An Application Program Interface (API) server 914 and a web server 916 are coupled to, and provide programmatic and web interfaces respectively to, one or more application servers 918. The application servers 918 host one or more marketplace engines 920 and summarization engines 922. The application servers 918 are, in turn, shown to be coupled to one or more databases servers 924 that facilitate access to one or more databases 926.

The marketplace engines 920 may provide a number of marketplace functions and services to users that access the networked system 902. The summarization engines 922 may likewise provide summarization services to users. While the marketplace and summarization engines 920 and 922 are shown in FIG. 9 to both form part of the networked system 902, it will be appreciated that, in alternative embodiments, the summarization engines 922 may form part of a summarization service that is separate and distinct from the networked system 902.

Further, while the system 900 shown in FIG. 9 employs a client-server architecture, the present invention is, of course, not limited to such an architecture, and could equally well find application in a distributed, or peer-to-peer, architecture system, for example. The various marketplace and payment applications 920 and 922 could also be implemented as standalone software programs, which do not necessarily have networking capabilities.

The web client 906 accesses the various marketplace and summarization engines 920 and 922 via the web interface supported by the web server 916. Similarly, the programmatic client 908 accesses the various services and functions provided by the marketplace and summarization engines 920 and 922 via the programmatic interface provided by the API server 914. The programmatic client 908 may, for example, be a seller application (e.g., the TurboLister application developed by eBay Inc., of San Jose, Calif.) to enable sellers to author and manage listings on the networked system 902 in an off-line manner, and to perform batch-mode communications between the programmatic client 908 and the networked system 902.

FIG. 9 also illustrates a third party application 928, executing on a third party server machine 930, as having programmatic access to the networked system 902 via the programmatic interface provided by the API server 914. For example, the third party application 928 may, utilizing information retrieved from the networked system 902, support one or more features or functions on a website hosted by the third party. The third party website may, for example, provide one or more promotional, marketplace or payment functions that are supported by the relevant applications of the networked system 902.

Figure 10:
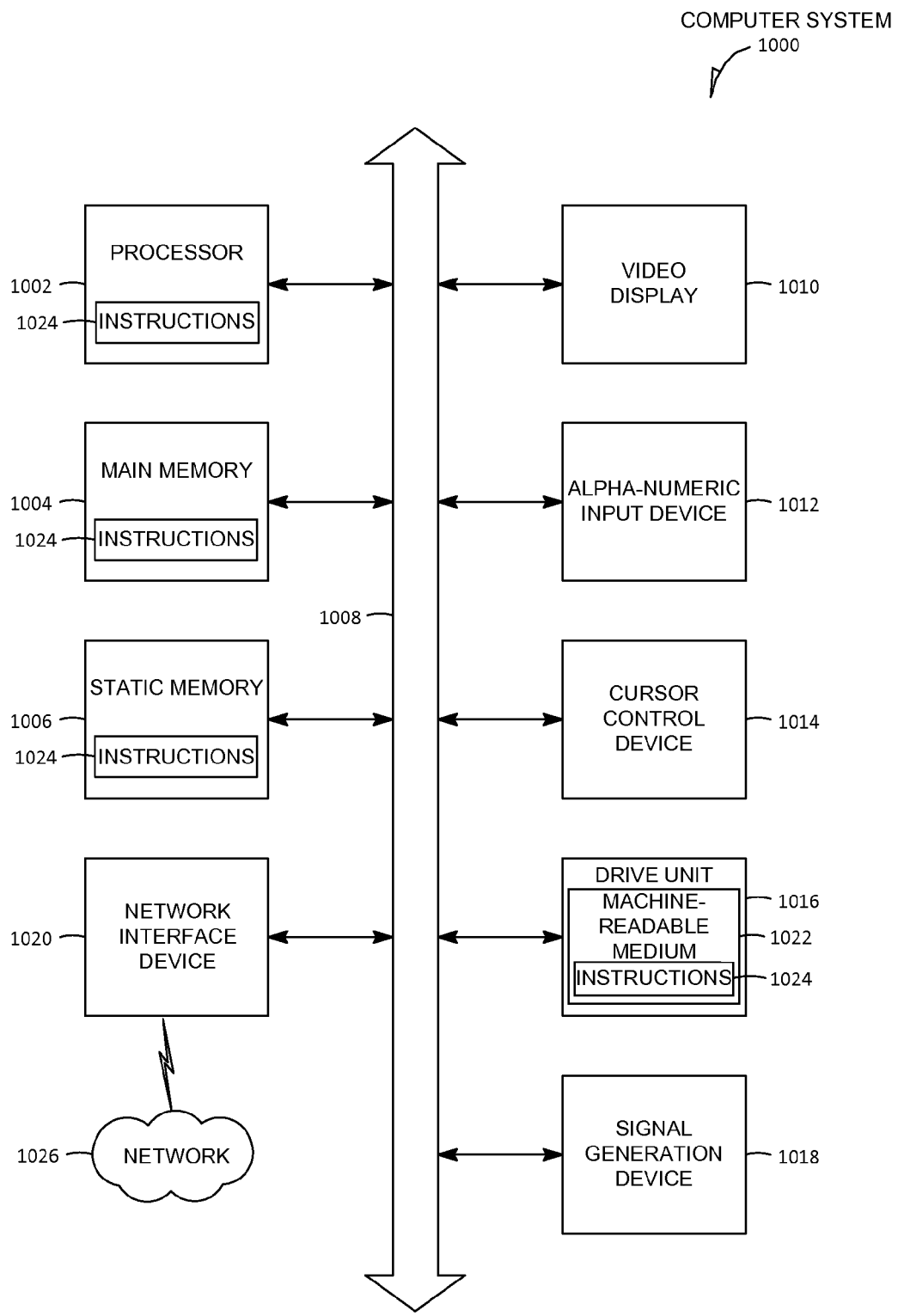
FIG. 10 shows a diagrammatic representation of machine in the example form of a computer system within which a set of instructions, for causing the machine to perform any one or more of the methodologies discussed herein, may be executed.

FIG. 10 shows a diagrammatic representation of machine in the example form of a computer system 1000 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a central processing unit (CPU) a graphics processing unit (GPU) or both), a main memory 1004 and a static memory 1006, which communicate with each other via a bus 1008. The computer system 1000 may further include a video display unit 1010 (e.g., a liquid crystal display (LCD) or a cathode ray tube (CRT)). The computer system 1000 also includes an alphanumeric input device 1012 (e.g., a keyboard), a cursor control device 1014 (e.g., a mouse), a disk drive unit 1016, a signal generation device 1018 (e.g., a speaker) and a network interface device 1020.

The disk drive unit 1016 includes a machine-readable medium 1022 on which is stored one or more sets of instructions (e.g., software 1024) embodying any one or more of the methodologies or functions described herein. The software 1024 may also reside, completely or at least partially, within the main memory 1004 and/or within the processor 1002 during execution thereof by the computer system 1000, the main memory 1004 and the processor 1002 also constituting machine-readable media.

The software 1024 may further be transmitted or received over a network 1026 via the network interface device 1020.

While the machine-readable medium 1022 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, and optical and magnetic media.

Thus, a method and system to summarize short comments have been described. The method and system described herein may operate to provide one or more technical solutions to technical problems including, but not limited to, improved database management, faster access to query results, more accurate query results, and providing a better user experience in the online publication system. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A system comprising:
   a memory to store a plurality of comments, the plurality of comments respectively comprising an overall rating of an entity and at least one phrase, the at least one phrase comprising a head term and a modifier associated with the head term; and
   one or more processors to implement:
   an aspect module to map respective head terms of a portion of the plurality of comments to an aspect cluster corresponding to an attribute of the entity, and a rating module to determine an aspect rating corresponding to the attribute of the entity based on the respective overall rating of the portion of the plurality of comments, and a module to cause presentation, on a client machine, of a graphical representation of the determined aspect rating corresponding to the attribute of the entity.

2. The system of claim 1, wherein the one or more processors are further to implement an extraction module to extract one or more phrases from the portion of the plurality of comments, the extracted phrases corresponding to the aspect cluster.

3. The system of claim 1, wherein the aspect module maps the portion of the plurality of comments to the aspect cluster by decomposing the plurality of comments into a plurality of aspect clusters, wherein the aspect cluster is included in the plurality of aspect clusters.

4. The system of claim 1, wherein the aspect module further comprises a k-means calculator to identify the aspect cluster using a k-means clustering algorithm.

5. The system of claim 1, wherein the aspect module further comprises an unstructured probabilistic latent semantic analysis (PLSA) calculator to identify the aspect cluster using an unstructured PLSA algorithm.

6. The system of claim 1, wherein the aspect module further comprises a structured probabilistic latent semantic analysis (PLSA) module to identify the aspect cluster using a structured PLSA algorithm.

7. The system of claim 1, wherein the aspect module further comprises an aspect estimator to incorporate a topic model corresponding to the aspect cluster.

8. The system of claim 1, further comprising an extraction module to extract at least one representative phrase from the portion of the plurality of comments.

9. The system of claim 1, wherein the rating module further comprises a global predictor to determine the aspect rating based on respective modifiers of the head terms comprising the at least one phrase of respective comments of the comments collection.

10. The system of claim 1, wherein the one or more processors are further to implement an evaluation module to evaluate the at least one phrase using a precision metric and a recall metric.

11. A method comprising:
using one or more computer processors, identifying a plurality of aspect clusters based on a plurality of comments, the plurality of comments respectively comprising an overall rating of an entity and at least one phrase, the identifying of the plurality of aspect clusters including:
identifying a head term in the at least one phrase of each comment in the plurality of comments, and
mapping each head term to one of a plurality of attributes of the entity, each aspect cluster of the plurality of aspect clusters corresponding to an attribute of the entity; and
determining an aspect rating corresponding to a first aspect cluster of the plurality of aspect clusters based on the overall rating of respective comments from a portion of the plurality of comments; and
causing presentation of a graphical representation of the aspect rating on a client machine.

12. The method of claim 11, further comprising evaluating an aspect coverage of the plurality of aspect clusters.

13. The method of claim 11, further comprising evaluating the plurality of aspect clusters using a user agreement on clustering accuracy.

14. The method of claim 11, further comprising evaluating the aspect rating using an aspect rating correlation.

15. The method of claim 11, further comprising evaluating the aspect rating using a ranking loss.

16. The method of claim 11, further comprising evaluating the at least one phrase using a precision metric and a recall metric.

17. The method of claim 11, wherein the identifying of the plurality of the aspect clusters is performed using at least one of k-means clustering, unstructured probabilistic latent semantic analysis (PLSA), or structured PLSA.

18. The method of claim 11, wherein the identifying of the plurality of the aspect clusters is based on a topic model corresponding to a respective aspect cluster.

19. The method of claim 11, wherein the determining of the aspect rating is performed using local prediction or global prediction.

20. A computer-readable storage medium having no transitory signals and embodying instructions executable by a processor for performing operations comprising:
identifying a plurality of aspect clusters based on a plurality of comments, the plurality of comments respectively comprising an overall rating of an entity and at least one phrase, the identifying of the plurality of aspect clusters including:
identifying a head term in the at least one phrase of each comment in the plurality of comments, and
mapping each head term to one of a plurality of attributes of the entity, each aspect cluster of the plurality of aspect clusters corresponding to an attribute of the entity; and
determining an aspect rating corresponding to a first aspect cluster of the plurality of aspect clusters based on the overall rating of respective comments from a portion of the plurality of comments; and
causing presentation of a graphical representation of the aspect rating on a client machine.

\* \* \* \* \*